United States Patent [19]

Yokomizo

[11] Patent Number: 4,673,972
[45] Date of Patent: Jun. 16, 1987

[54] COLOR IMAGE PROCESSING APPARATUS IN WHICH DIFFERENT COLOR SIGNALS OF DIFFERENT COLORS ARE READ INTO DIFFERENT MEMORIES AT DIFFERENT RATES

[75] Inventor: Yoshikazu Yokomizo, Kawagoe, Japan

[73] Assignee: Canon Kabushiki Kaisha, Tokyo, Japan

[21] Appl. No.: 586,068

[22] Filed: Mar. 5, 1984

[30] Foreign Application Priority Data

Mar. 8, 1983 [JP] Japan ................................. 58-38028

[51] Int. Cl.$^4$ .................. H04N 1/46; H04N 1/04; H04N 1/21
[52] U.S. Cl. ........................................ 358/77; 358/75; 358/78; 358/287
[58] Field of Search ................. 358/78, 80, 75, 77, 358/287, 75 IS

[56] References Cited

U.S. PATENT DOCUMENTS

| | | | |
|---|---|---|---|
| 2,575,714 | 11/1951 | Johnson et al. ........................ | 358/75 |
| 3,541,245 | 11/1970 | Wilby ..................................... | 358/280 |
| 4,216,495 | 8/1980 | Neilson et al. ......................... | 358/78 |
| 4,323,919 | 4/1982 | Fujii et al. .............................. | 358/75 |
| 4,366,508 | 12/1982 | Crean et al. ............................ | 358/77 |

Primary Examiner—James J. Groody
Assistant Examiner—Randall S. Svihla
Attorney, Agent, or Firm—Fitzpatrick, Cella, Harper & Scinto

[57] ABSTRACT

A color image processing system comprises a plurality of color image data generators each for generating color image data for different colors and a plurality of memories each for storing the color image data generated for each color by one of the color image data generators. A writing control device independently controls the speed at which color image data is written into respective ones of the plurality of memories. This control device includes an address counter for determining writing addresses of respective ones of the plurality of memories, a clock pulse generator, and a clock pulse control device for variably controlling the number of clock pulses supplied to the first address counter for determining the rate at which the writing addresses are determined. A read out device reads out the color image data stored in each of the memories and a recording device records the color image data for each color in response to output from the read out device. This color image processing system permits accurate registration of images reproduced on a single medium in each of the plurality of colors by independently adjusting the magnification of an image reproduced in each respective color. Thus complex and expensive optical elements, used in the past to adjust magnification of an image reproduced in each color, may be eliminated.

7 Claims, 5 Drawing Figures

COLOR IMAGE PROCESSING APPARATUS IN WHICH DIFFERENT COLOR SIGNALS OF DIFFERENT COLORS ARE READ INTO DIFFERENT MEMORIES AT DIFFERENT RATES

BACKGROUND OF THE INVENTION

1. Field of the Invention

The present invention relates to an apparatus for conducting color image processing after color image information is converted into electric signals.

2. Description of the Prior Art

There is already known such color image processing apparatus in which a color original is read by scanning with an image sensor such as a charge-coupled device (CCD) through three color filters to obtain electric color information which is used for producing a color image through an ink jet printer equipped with ink emitting nozzles respectively emitting ink of three different colors.

FIG. 1 shows a conventional color image processing apparatus in a block diagram, wherein shown are an original 1; a light source 2; a lens 3; dichroic mirrors 4; CCD line sensors 5a, 5b, 5c; analog-to-digital (A/D) converters 6a, 6b, 6c; buffer memories 7a, 7b, 7c; a masking circuit 8; dither circuits 9a, 9b, 9c; ink jet printers 10a, 10b, 10c; a sheet feeding roller 11; tension rollers 12; driving rollers 13; a copy 14; and a supporting plate 15. In the following drawings, components the same as those shown in FIG. 1 will be represented by the same numbers. The suffixes a, b and c indicate components related with three primary colors after color separation.

In FIG. 1, the original 1 is illuminated by the light source 2 to color separate the image information of said original 1 into the color components of blue, green and red through the lens 3 and the dichroic mirrors 4. Thus separated color components are photoelectrically converted into electric signals by means of the CCD line sensors 5a, 5b, 5c. The analog image signals of blue (B), green (G) and red (R) colors are converted, in the A/D converters 6a, 6b, 6c, into digital signals, which are subjected to modification of the transfer speed in the buffer memories 7a, 7b, 7c. Then, the signals B, G, R suitable for additive mixing are converted into signals of yellow (Y), magenta (M) and cyan (C) suitable for subtractive mixing in the masking circuit 8, which also processes each signal in relation to other signals for achieving correction in consideration of the spectral characteristics of the yellow, magenta and cyan inks. Said signals Y, M, C are binary digitized through comparison with a predetermined threshold matrix in the dither circuits 9a, 9b, 9c to activate ink jet printers 10a, 10b, 10c equipped with ink emitting nozzles corresponding to the signals Y, M, C, thereby simultaneously printing three colors on a printing sheet supplied from the feeding roller 11, thus obtaining the color copy 14 of the original 1.

In the present example, the dimensional errors in the image magnification among the signals B, G, R are practically negligible since the color signals B, G, R are produced through a common lens 3 and CCD line sensors 5a, 5b, 5c which are manufactured dimensionally uniform by a photoetching process. Dimensional errors include errors in the dimensions of the color-separated images in the reproduction of the original image, by means of the ink jet printers in the present example, giving rise to positional color aberrations in the synthesized image. It is however extremely difficult to deposit the inks from the ink jet printers 10a, 10b, 10c onto the same position.

In order to avoid the above-mentioned difficulty, there is proposed, as shown in FIG. 2, an apparatus for positioning the ink jet printers 10a, 10b, 10c at determined intervals. In such arrangement, in order to cover the differences in the writing time of different colors by the ink jet printers 10a, 10b, 10c, it becomes necessary to use an unrepresented page memory.

Also the use of three independent optical systems gives rise to non-negligible dimensional errors in the image magnification among different color images due to an influence of mechanical imprecision. For this reason it is considered to regulate the image magnification of each color with zoom lenses 17a, 17b, 17c as shown in FIG. 2 projecting the image through respective optical elements 16a, 16b, and 16c to the respective CCD line sensors 5a, 5b, and 5c.

Such arrangement is however undesirable because it involves precise and inevitably expensive zoom lenses and in addition requires cumbersome optical adjustment.

Furthermore, in case of arbitrarily modifying the magnification of a color image on a document, there has conventionally been required a complicated structure for each separated color.

SUMMARY OF THE INVENTION

In consideration of the foregoing, an object of the present invention is to provide a color image processing apparatus capable of appropriate color image reproduction.

Another object of the present invention is to provide a color image processing apparatus capable of preventing positional color aberration in the image reproduction.

Still another object of the present invention is to provide a color image processing apparatus capable of arbitrarily modifying the magnification of a color image.

Still another object of the present invention is to provide a color image processing apparatus capable of independently modifying the magnification of the image for each primary color through a simple structure.

Still another object of the present invention is to provide a color image processing apparatus capable of controlling the addressing speed to a memory in which the input color image data are stored.

Still another object of the present invention is to provide a color image processing apparatus capable of preventing positional color aberrations by controlling the addressing speed at the readout of the color image data from a memory.

Still another object of the present invention is to provide a color image processing apparatus capable of modifying the magnification of a color image and regulating the magnifications of three primary color images in an inexpensive electrical manner, without relying on complex and precise optical means such as zoom lenses and without requiring cumbersome optical adjustment.

Still another object of the present invention is to provide a color image processing apparatus capable of preventing fluctuation in color and capable of simultaneous image reading and printing at different places, by positioning the printing elements at a pitch the same as that of the optical systems for reading different colors of the original.

The foregoing and still other objects of the present invention will become fully apparent from the following description.

DETAILED DESCRIPTION OF THE PREFERRED EMBODIMENTS

Now the present invention will be explained in detail by an embodiment thereof shown in the attached drawings.

Figure 1:
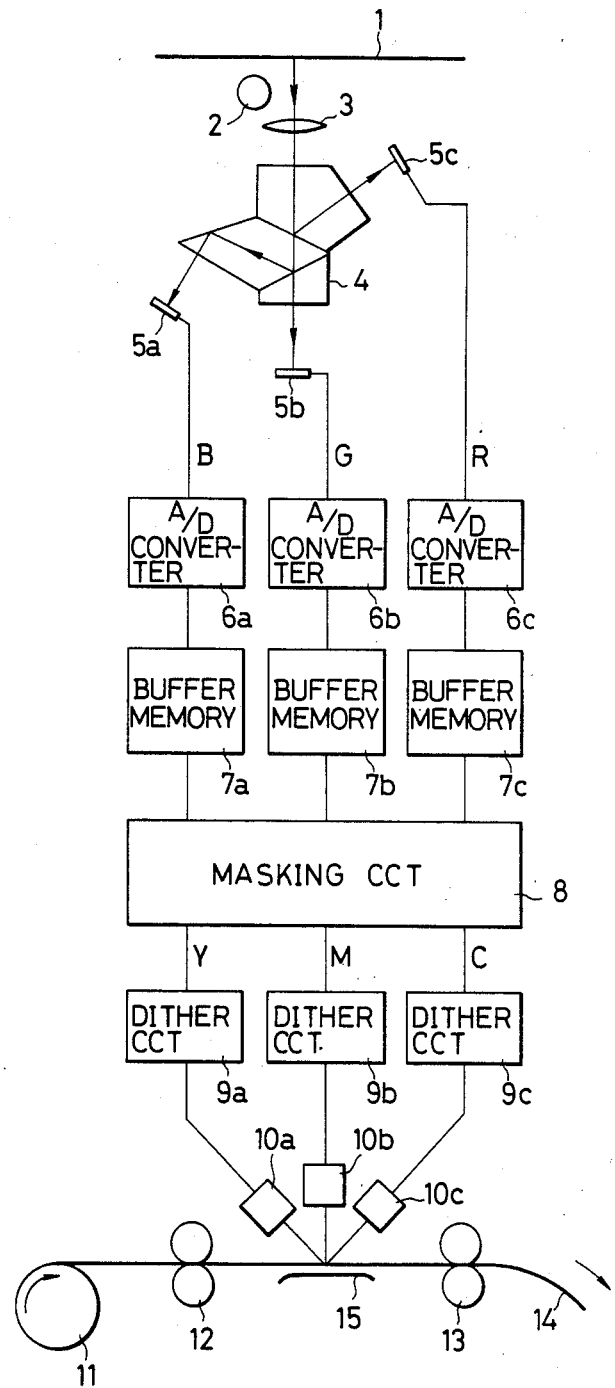
FIG. 1 is a block diagram showing a first example of the conventional color image processing apparatus.
Figure 2:
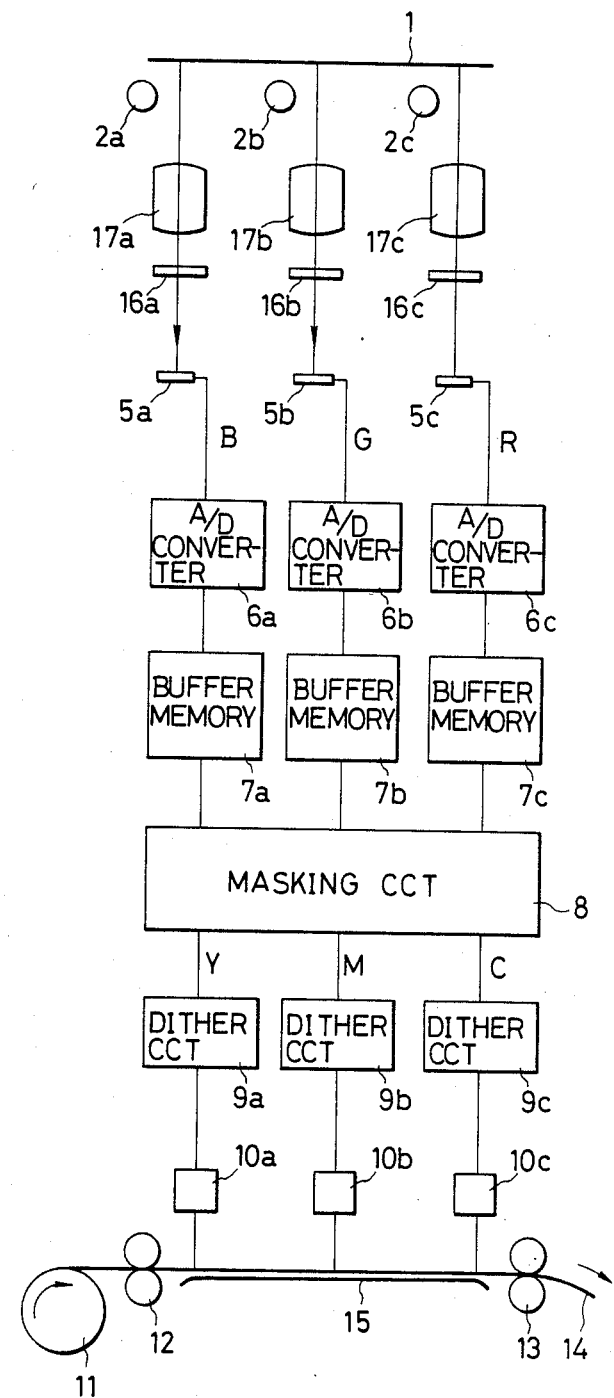
FIG. 2 is a block diagram showing a second example of the conventional color image processing apparatus.
Figure 3:
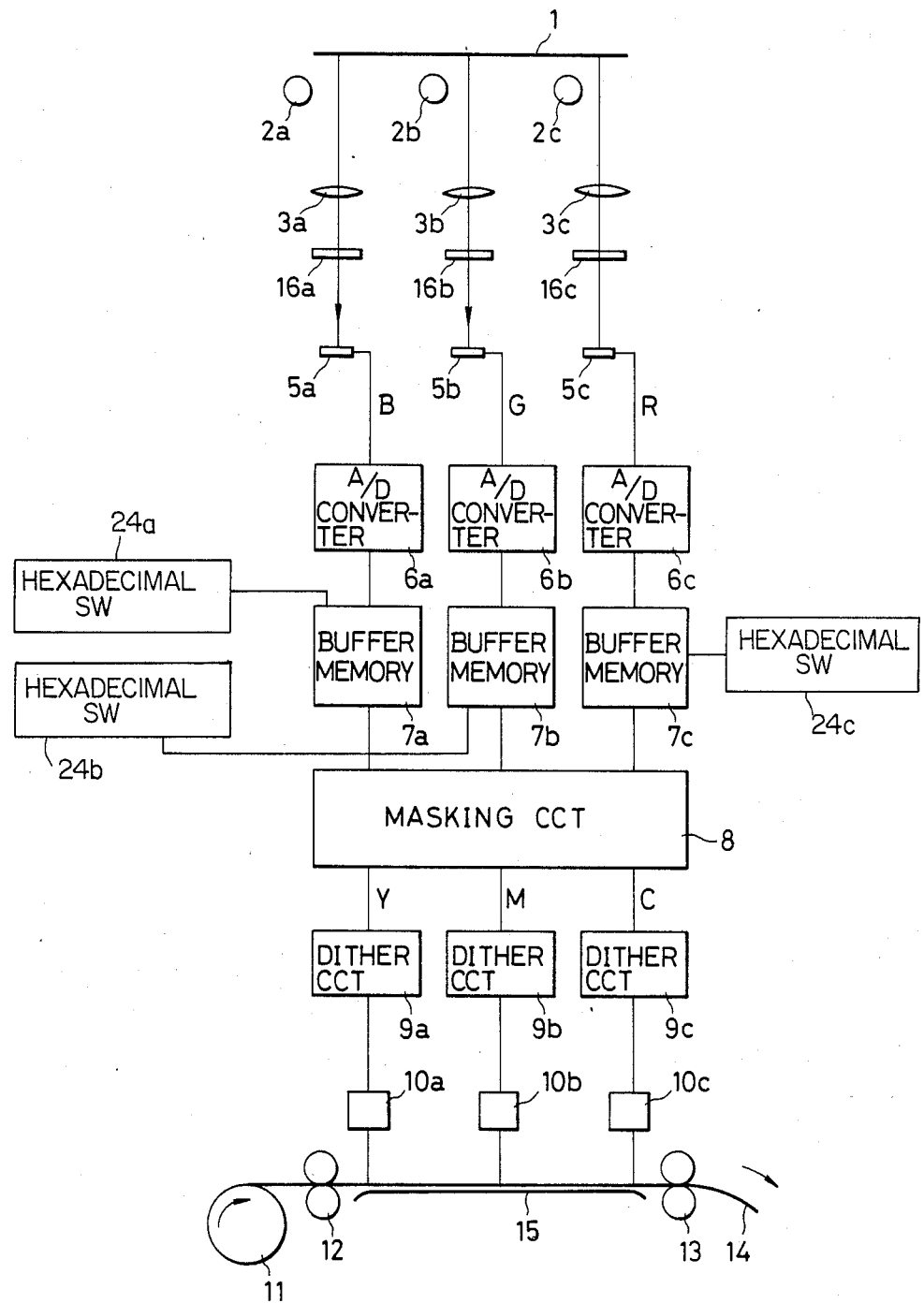
FIG. 3 as a block diagram showing a color image processing apparatus embodying the present invention.

FIG. 3 shows, as a block diagram, a color image processing apparatus embodying the present invention, wherein the same components as those in FIGS. 1 and 2 are represented by the same numbers.

Figure 4:
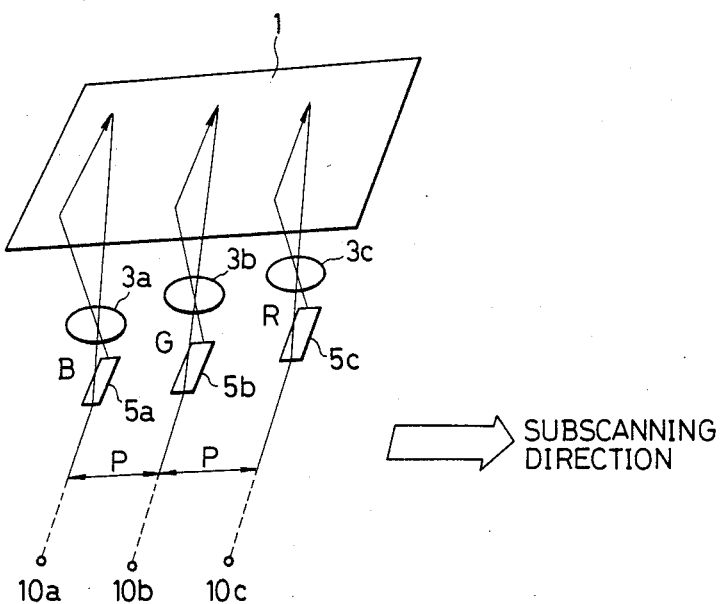
FIG. 4 is a schematic view showing the relationship between the pitch of the CCD line sensors and that of the ink jet printers.

In FIG. 3, lenses 3a, 3b, 3c of a fixed image magnification are subjected to optical adjustments such as those of focus, position and angle, other than that of image magnification which is conducted when the signals B, G, R are stored in buffer memories 7a, 7b, 7c. In the arrangement shown in FIG. 3, the mounting pitch P of three CCD line sensors 5 in the subsidiary scanning direction is selected to be equal to the mounting pitch of the ink jet printers 10a, 10b, 10c (cf. FIG. 4). Consequently it is possible to absorb the difference in the writing time thereby preventing distortion in color and to simultaneously effect image reading and image printing at different positions for each color.

Figure 5:
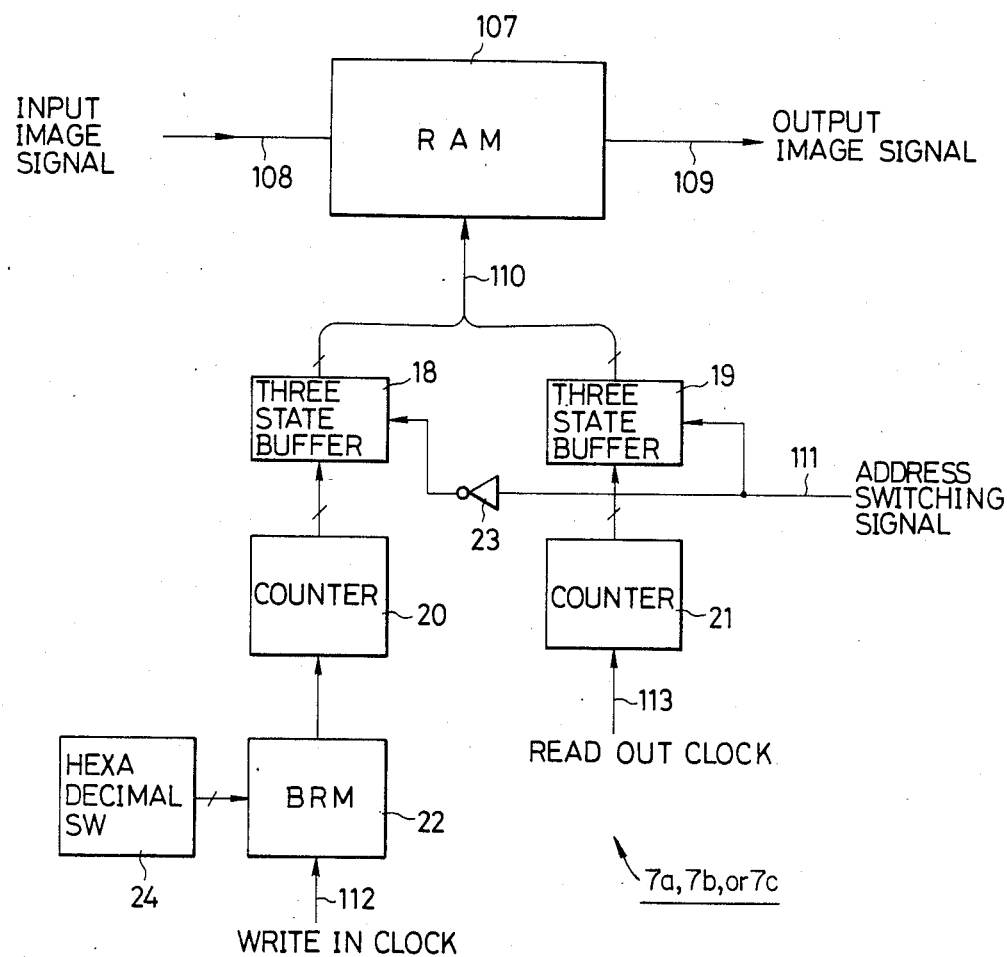
FIG. 5 is a detailed block diagram showing a buffer memory in FIG. 3 and peripheral circuits thereof.

Now reference is made to FIG. 5 for explaining the control on the addressing speed at the image signal storage into the buffer memories for the purpose of magnification adjustment.

FIG. 5 shows the buffer memory 7a, 7b or 7c shown in FIG. 3 and the peripheral circuits thereof. A random access memory (RAM) 107 is provided with an input data line 108 and an output data line 109.

The input image data supplied from the A/D converter 6a, 6b or 6c are supplied through the input data line 108 to the RAM 107 for storage therein, and are subsequently read through the output data line 109 for supply to the masking circuit 8. An address bus 110 for selecting a particular address in the RAM 107 is controlled by either one of two three-state buffers 18, 19, which are selected by an address switching signal 111. The address bus 110 is controlled by the three-state buffer 19 or 18 respectively when said signal is in the high-level state, indicating signal readout from the RAM 107, or in the low-level state, indicating the signal write-in into the RAM 107. Counters 20, 21 supply output signals respectively to the three-state buffers 18, 19 as write-in and read-out address signals for the RAM 107.

The counter 20 for generating the write-in address signals receives count clock pulses through a binary rate multiplier (BRM) 22, which is capable of arbitrarily reducing write-clock pulses 112 supplied thereto according to a value determined by a hexadecimal switch 24 connected to said BRM 22. (Three hexadecimal switches 24a, 24b, and 24c are shown in FIG. 3 respectively in association with buffer memories 7a, 7b, and 7c.) Consequently the hexadecimal switch 24 determines the addressing speed to the RAM 107 at the signal write-in. Since the BRM only has a function of reducing the number of clock pulses, the frequency of the write-in clock pulses is selected equal to or larger than the required maximum frequency.

In this manner the input image data are compressed by pixel reduction or expanded by repeated recording of the same pixel at the signal write-in into the RAM 107, thus enabling adjustment of image magnification for each color.

On the other hand, the frequency of the readout clock pulses 113 for the counter 21 is for example selected to be equal to the frequency of the ink droplet emissions from the ink jet printers 10a, 10b, 10c and is therefore constant, depending upon the performance of said ink jet printers.

Now there will be explained the function of the embodiment shown in FIG. 5. The photoelectrically converted serial image signals of a determined rate are supplied from the CCD line sensors 5a, 5b, 5c through the A/D converters 6a, 6b, 6c to the input data line 108 of the RAM 107. The image signals supplied to said input data line 108 are stored into the RAM 107 at the rate of the clock pulses, which rate is reduced by a proportion to be determined by the hexadecimal switch 24. When the image signals corresponding to the effective cell number of the CCD line sensors 5a, 5b, 5c are all stored in the RAM 107, the control for the address bus 110 is shifted to the three-state buffer 19, whereby the stored image signals are read at a determined rate to effect recording with the ink jet printers 10a, 10b, 10c corresponding to a line in the CCD line sensors. Said signal readout operation is conducted at the same time for the different colors. Thus, the modification of the image magnification is achieved by changing the write-in speed of the image information into the RAM 107 with respect to the transfer rate of the serial image information from the CCD line sensors 5a, 5b, 5c. At a higher write-in rate into the RAM 107, the serial image information of a fixed transfer rate are repeatedly recorded in different addresses of the RAM 107 while at a lower write-in rate said serial image information are partially skipped at storage. In reproducing the image by reading the thus stored information with the readout clock pulses 113 of a determined rate, the obtained image is either enlarged by the presence of repeated image information in case of a high write-in rate, or reduced because of the skipped image information in case of a low write-in rate. In this manner the image magnification can be modified by the hexadecimal switch 24.

Thus it is possible to obtain a color image of a desired size by selecting corresponding values for the hexadecimal switches 24 of different colors. In such case it is rendered possible, after setting the switches 24 at a determined setting, to adjust one of the switches 24 corresponding to one color component showing a positional image error, thereby significantly improving the quality of the color image modified to a desired size.

In another embodiment, in an apparatus in which the color separation is achieved by three scannings of the original image, the positional aberration of different colors in the subsidiary scanning direction can be corrected, or the image magnification can be modified, by regulating the relative speed, namely the subsidiary scanning speed, between the document and the CCD sensors 5a–5c. This function is achieved by controlling the speed of a document moving motor in response to the setting of the hexadecimal switch 24.

In the foregoing description the modification of the image magnification is achieved by controlling the addressing speed at the signal write-in into the buffer memories, but this objective can also be achieved by regulating the signal read-out speed from the buffer memories while maintaining a constant signal write-in speed.

Also in the foregoing embodiment the addressing speed is controlled by skipping the clock pulses by means of a binary rate multiplier, but this objective can also be achieved by regulating the frequency of the clock pulses, for example with a multivibrator.

What I claimed is:

1. A color image processing system comprising:
   a plurality of color image data generation means each for generating color image data for a different color;
   a plurality of memory means each for storing the color image data for one color generated by one of said color image data generation means;
   a plurality of writing control means for independently controlling the speed at which color image data is written into respective ones of said plurality of memory means, each said writing control means including a first address counter for determining writing addresses of a respective one of said plurality of memory means, means for supplying clock pulses to said address counter, and clock pulse control means for variably controlling the number of clock pulses supplied to said first address counter for determining the rate at which said writing addresses are determined;
   a plurality of readout means for reading out the color image data stored in each of said memory means; and
   recording means for recording, in response to outputs from said plurality of readout means, the color image data for each color.

2. A color image processing system according to claim 1, wherein said clock pulse control means comprises a rate multiplier capable of skipping clock pulses supplied by said clock pulse supplying means.

3. A color image processing system according to claim 2, wherein said clock pulse control means further comprises input means for entering a proportion for determining the multiplication rate of said rate multiplier.

4. A color image processing system according to claim 1, wherein each said readout means comprises a second address counter for determining readout addresses of a respective one of said plurality of memory means upon reading out of the color image data stored in said respective one of said memory means.

5. A color image processing apparatus comprising:
   color image data generation means for generating color image data for a plurality of different colors;
   a plurality of memory means each for storing the color image data for one color;
   writing means for writing the color image data into each of said memory means;
   readout means for reading out the color image data stored in each of said memory means; and
   control means for independently controlling the writing speed of said writing means for writing the color image data for each color into respective ones of said memory means.

6. A color image processing apparatus according to claim 5, further comprising masking processing means for masking processing the color image data for each color read out from said memory means, and reproducing means for reproducing a color image in response to outputs from said masking processing means.

7. A color image processing apparatus according to claim 6, wherein said reproducing means includes an ink-jet recording device which projects ink droplets to form an image.

* * * * *